United States Patent
Gong et al.

(10) Patent No.: US 8,340,601 B2
(45) Date of Patent: Dec. 25, 2012

(54) MU MIMO SUPPORT WITH HIGHLY DIRECTIONAL ANTENNAS

(75) Inventors: Michelle X. Gong, Sunnyvale, CA (US); Dmitry Akhmetov, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 12/952,848

(22) Filed: Nov. 23, 2010

(65) Prior Publication Data

US 2012/0071116 A1   Mar. 22, 2012

Related U.S. Application Data

(60) Provisional application No. 61/384,547, filed on Sep. 20, 2010.

(51) Int. Cl.
*H04B 1/00* (2006.01)
(52) U.S. Cl. .................. 455/114.2; 455/63.1; 455/63.4; 455/226.2; 455/226.3
(58) Field of Classification Search .................. 455/501, 455/63.1, 63.4, 562.1, 575.7, 101, 114.2, 455/226.2, 226.3, 272, 296
See application file for complete search history.

(56) References Cited

U.S. PATENT DOCUMENTS

| | | | |
|---|---|---|---|
| 2006/0171357 A1* | 8/2006 | King et al. | 370/331 |
| 2009/0189812 A1 | 7/2009 | Xia et al. | |
| 2009/0232023 A1 | 9/2009 | Soffer et al. | |
| 2009/0238156 A1 | 9/2009 | Yong et al. | |
| 2009/0247148 A1* | 10/2009 | Chen et al. | 455/422.1 |
| 2010/0103045 A1 | 4/2010 | Liu et al. | |
| 2010/0120415 A1* | 5/2010 | Urquhart et al. | 455/424 |

OTHER PUBLICATIONS

Yiu et al., "SDMA for 60GHz Gigabit Wireless Networks", IEEE International Conference on Communications (ICC'09), Jun. 14-18, 2009, pp. 1-6.

* cited by examiner

*Primary Examiner* — Tuan Pham
(74) *Attorney, Agent, or Firm* — Kacvinsky Daisak PLLC

(57) ABSTRACT

In various embodiments, a network controller in a multi-user multiple input multiple output (MU MIMO) network may perform training for directional communications with multiple mobile devices. It may organize the mobile devices into different groups, with all the mobile devices in a single group able to communicate simultaneously with the network controller without excessive interference from each other. Various techniques may be used for such training and grouping.

23 Claims, 5 Drawing Sheets

MU MIMO SUPPORT WITH HIGHLY DIRECTIONAL ANTENNAS

CROSS REFERENCE TO RELATED APPLICATIONS

This application is derived from U.S. provisional patent application 61/384,547, filed Sep. 20, 2010, and claims the benefit of that priority date for all applicable subject matter.

BACKGROUND

In many wireless networks using channels in the 60 GHz range, line of sight signal paths are the predominant signal paths because the signals, especially reflected signals, are severely attenuated. This makes such networks well-suited for efficient spatial reuse, and are therefore good candidates for multi-user multiple input multiple output (MU MIMO) communications. In such networks, beam forming is important to create the highly directional channels needed for spatial reuse. Conventional methods of channel training are not well-suited for creating multiple spatial channels.

BRIEF DESCRIPTION OF THE DRAWINGS

Some embodiments of the invention may be better understood by referring to the following description and accompanying drawings that are used to illustrate embodiments of the invention. In the drawings.

DETAILED DESCRIPTION

Figure 1:
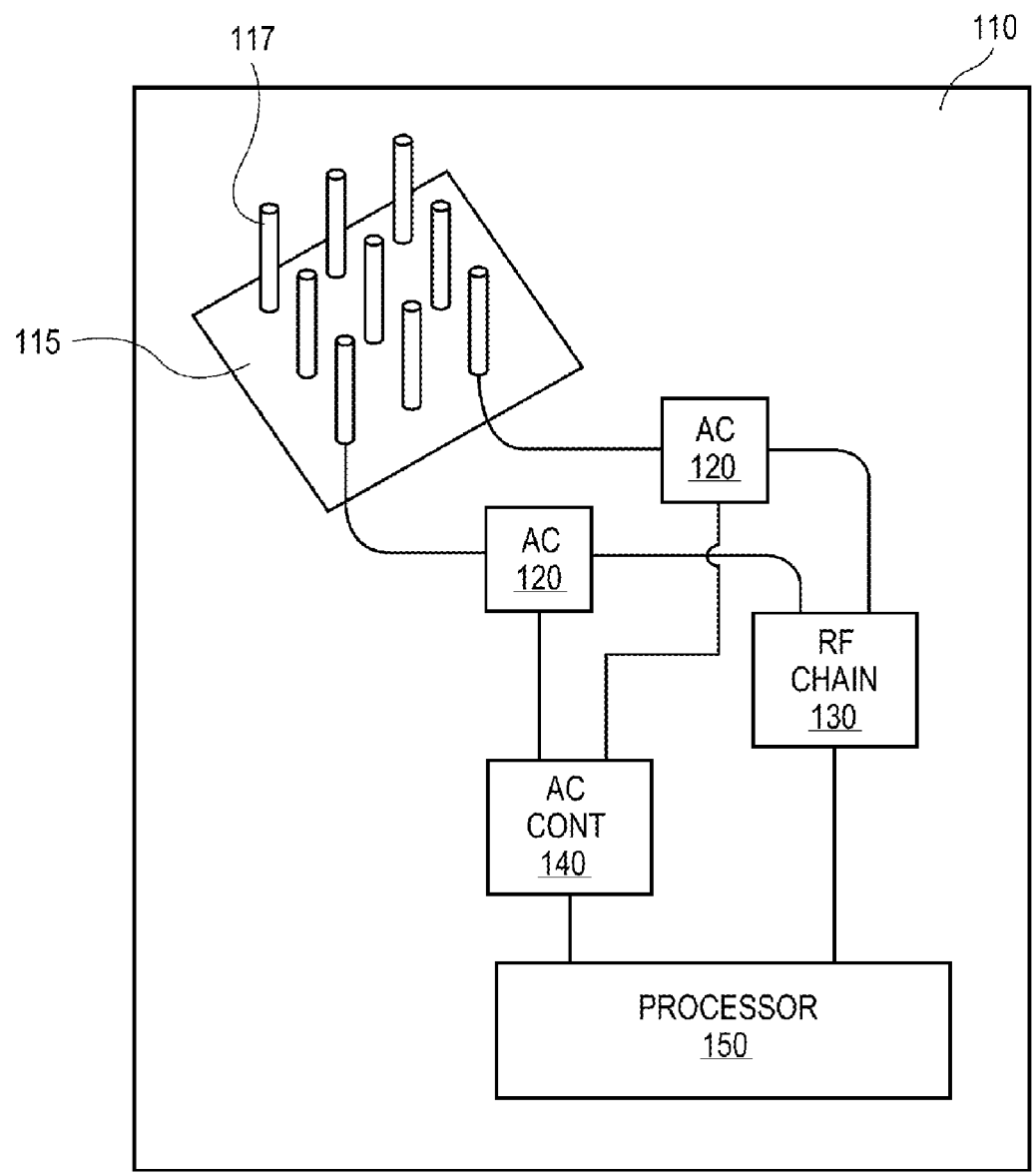
FIG. 1 shows a wireless device with a multi-element antenna and associated electronics, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not have intervening physical or electrical components between them.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a tangible non-transient computer-readable medium, which may be read and executed by one or more processors to enable performance of the operations described herein. Such a computer-readable medium may include any tangible non-transient mechanism for storing information in a form readable by one or more computers, such as but not limited to read only memory (ROM); random access memory (RAM); magnetic disk storage media; optical storage media; a flash memory device, etc.

The term "wireless" may be used to describe circuits, devices, systems, methods, techniques, communications channels, etc., that communicate data by using modulated electromagnetic radiation through a non-solid medium. The term does not imply that the associated devices do not contain any wires. A wireless device may comprise at least one antenna, at least one radio, at least one memory, and at least one processor, where the radio transmits signals through the antenna that represent data and receives signals through the antenna that represent data, while the processor may process the data to be transmitted and the data that has been received. The processor may also process other data which is neither transmitted nor received.

As used within this document, the term "network controller" is intended to cover devices that schedule and control, at least partially, wireless communications by other devices in the network. A network controller may also be known as a base station (BS), access point (AP), central point (CP), or any other term that may arise to describe the functionality of a network controller.

As used within this document, the term "mobile device" is intended to cover those devices whose wireless communications are at least partially scheduled and controlled by the network controller. A mobile device (MD) may also be known as a mobile station (MS), STA, subscriber station (SS), user equipment (UE), or any other term that may arise to describe the functionality of a mobile device. Mobile devices may move during such communications, but movement is not required.

In various types of wireless technology, a wireless device with a multi-element antenna may transmit and receive in a directional manner. Although each element may have omni-directional characteristics by itself, by adjusting the phase and amplitude of the signal being transmitted from each element, the combined transmissions may produce an overall signal that is strong in one direction and weak in other directions. Similarly, by adjusting the phase and amplitude of the signal received by each element, directional reception may be achieved.

A typical network may have multiple devices that communicate with each other, such as a network controller and multiple mobile devices that communicate directly with the network controller. Within this document, the term MU MIMO (multi-user multiple input multiple output) indicates a network in which the network controller and each of multiple mobile devices all have at least one multi-element antenna and are each capable of directional communication.

FIG. 1 shows a wireless device with a multi-element antenna and associated electronics, according to an embodiment of the invention. In the illustrated device 110, antenna 115 has nine antenna elements 117 arranged in a 3×3 rectangular array. Other embodiments may have other quantities of antenna elements, which may be arranged in other geometric configurations. Each element 117 is connected to a separate analog circuit (AC) 120, which may have adjustable capacitive and/or inductive and/or resistive components that may shift the phase and/or amplitude of the signal going between the antenna element and the RF chain 130. Only two such analog circuits are shown to avoid cluttering up the drawing, but each antenna element 117 may have its own associated analog circuit 120. The value of, and effect of, these analog components may be individually set by AC Control circuit 140. The settings that will control the values of these analog components for all the antenna elements in a given antenna 115 are referred to herein as an 'antenna weight vector' (AWV). Each AWV may produce its own set of a main lobe in one direction and one or more null lobes in other directions, with particular angular widths for each of those lobes. A single RF chain 130 may be used for the signals going to/from the analog circuits 120. Additional processing unit(s) 150 may provide additional processing as needed.

In most embodiments, the same antenna 115 will be used for both transmission and reception, but other embodiments may have a separate array for each. In some embodiments that have the same antenna 115 for transmission and reception, there may one set of analog circuits 120 for transmission and another set for reception. In some embodiments, a device 110 may have multiple antennas, with each antenna having a multi-element array with its own RF chain and set of analog circuits.

Figure 2:
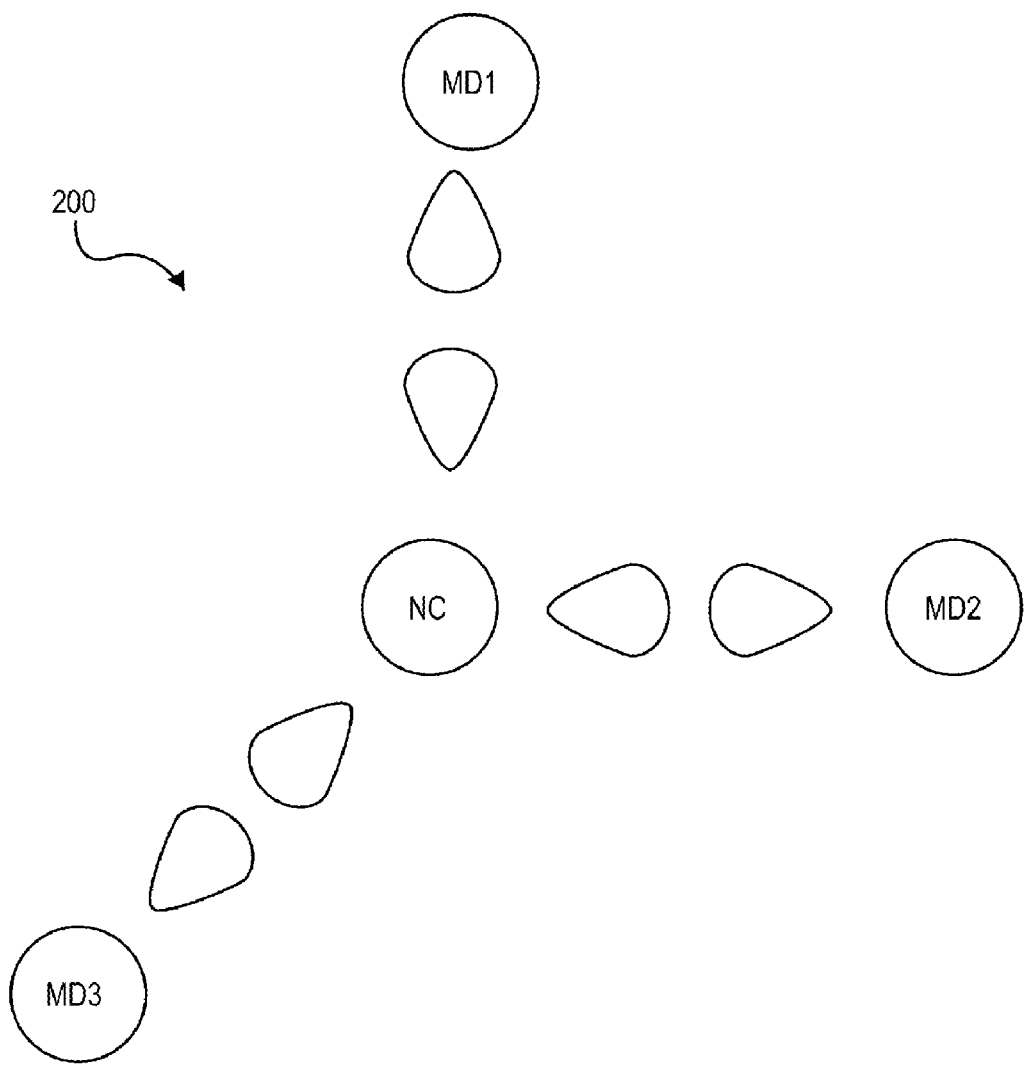
FIG. 2 shows a MU MIMO wireless network, according to an embodiment of the invention.

FIG. 2 shows a MU MIMO wireless network, according to an embodiment of the invention. In the illustrated network 200, a network controller NC may control communications by each of three mobile devices MD1, MD2, and MD3. Each of mobile devices MD1, MD2, and MD3 is assumed to have at least one multi-element antenna and therefore be able to transmit directionally and to receive directionally in at least one direction that is controllable by the device. Network controller NC is assumed to have multiple antennas, each antenna being multi-element, and the NC may be able to simultaneously transmit (or receive) different signals with each antenna at the same frequency(s) in a different direction, each direction being controllable by the device.

The cone-shaped figures next to each device indicate that the device is able to transmit a sufficiently strong signal within the arc of the cone, and able to receive and decode a sufficiently strong signal within the arc of the cone, even though communications outside the arc of the cone may not be transmitted or received reliably. This indicates directionality in the wireless communications with that device. The angular size of each arc may vary, based on a number of factors not discussed here. Since the NC is shown communicating with three different MD's simultaneously, it must have at least three antennas, but it may have more. In general, a MU MIMO device may simultaneously transmit (or receive) in as many different directions as it has multi-element antennas, provided the directions do not overlap enough to cause interference with each other.

In various embodiments, a network controller (NC) may perform training with multiple mobile devices. It may then organize the mobile devices into different groups, with all the mobile devices in a single group able to communicate simultaneously with the NC on the same frequency(s) without excessive interference from each other. Multiple such groups may be formed, if needed, to adequately communicate with all the MDs. Three different types of training are described. In one type, the NC may perform sector training with each of several MDs, so that each MD is determined to be located within a particular pre-defined sector. In another type, the NC may try different AWVs to refine the results that could be obtained with sector training alone. In a third type, the NC may try different pre-coded matrices to refine the results that could be obtained with sector training alone.

Sector Training

Figure 3A:
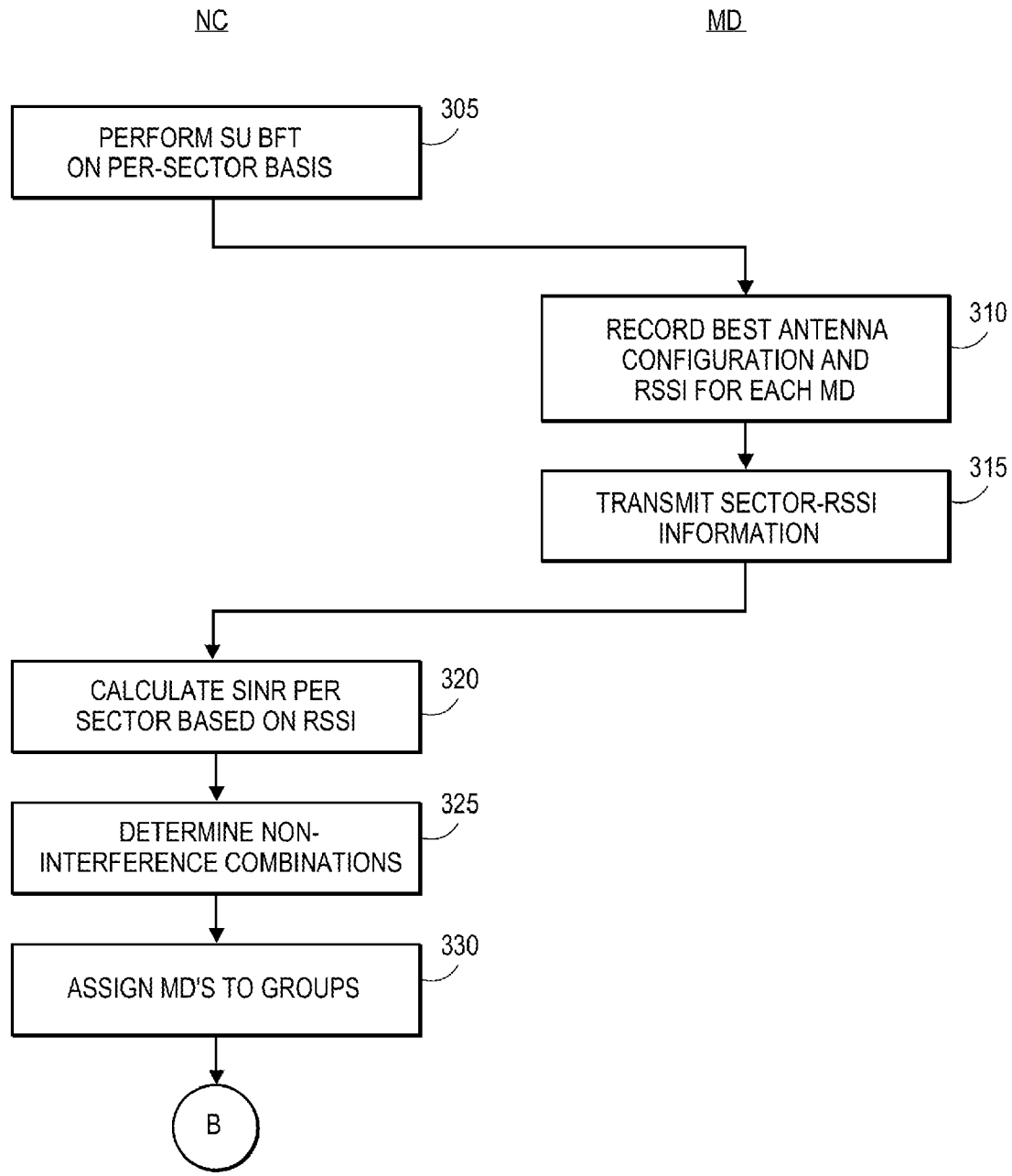
FIG. 3A shows a flow diagram of a method of sector training, according to an embodiment of the invention.

FIG. 3A shows a flow diagram of a method of sector training, according to an embodiment of the invention. Sector training involves determining which of multiple pre-defined angular sectors each MD is located in, so that the NC may communicate with that MD by directing communications to that sector. Pre-defined sectors are sectors that can be accessed using pre-defined antenna weight vectors, without further antenna training Although this technique involves formed directional beams, the parameters to form each beam are already known and stored in the device, rather than being determined through an ad hoc communications exchange.

After each MD has been associated with a particular sector, the NC may also determine how directional communications within a targeted sector will be affected by directional communications within the other sectors. The result of this determination is that the MDs may be organized into groups such that the NC may simultaneously communicate directionally with every MD in a group, without excessive interference between the devices in that group.

In the illustrated embodiment, a NC may perform sector training with a single MD on a per-sector basis at 305. A 'sector' indicates a pre-determined direction of transmission or reception, with a pre-determined angular coverage arc, from the point of view of a single communicating device. In some embodiments all the available sectors may collectively cover the entire 360 degree coverage area for that device. For example, a device may be pre-configured to cover 12 sectors that are each 30 degrees wide, thus providing a full circle of coverage overall.

The sector-by-sector transmissions may typically be done by having the NC make a transmission in the direction of each sector in turn, with an identifier in each transmission indicating which sector it covers. In some cases, more than one transmission may be made for each sector, to provide better reliability in case a transient condition interfered with one of the sector transmissions. In most cases, the wireless device making the transmissions will have been pre-calibrated for the AWVs needed for sector-by-sector transmissions, so no training should be needed to determine the AWV needed for transmitting in the directions of a particular sector, with the predefined angular width of that sector.

As the NC transmits to each sector, one sector at a time, at 310 each MD may receive the sector transmissions that it's capable of receiving, and for each received sector transmission, record the sector identifier and RSSI parameter (received signal strength indicator). In many instances, a particular MD will be able to receive the transmissions for multiple sectors, but may not be able to receive a measurable signal for every sector. The MD may also make other channel measurements.

At 315 the MD may transmit the recorded sector identifier and associated channel measurements (such as but not limited to RSSI, tap delay, etc.) back to the NC for each sector transmission in which a signal was recorded by that MD. Various communications protocols may be used to perform this exchange of information. At this point, for each MD the NC now has an RSSI parameter for transmissions to the MD's sector (the sector at which the MD recorded the strongest RSSI) and also for transmissions to every other sector, as those transmissions were detected by that MD. Sectors for which the MD recorded no RSSI may be assumed have an RSSI of zero.

Since the ultimate goal may be to transmit to multiple MDs simultaneously, which will require using multiple antennas simultaneously, operations 305-315 may be repeated for each antenna on the NC. In some embodiments this may be done sequentially (complete the operations for one antenna before starting operations for another antenna), while in other embodiments the various antennas may perform operations 305-315 concurrently (i.e., wait until operations 305, 310 have been completed for all antennas before performing operation 315).

At 320, the NC may calculate the signal-to-interference-and-noise-ratio (SINR) that will be seen by an MD in a particular sector, when a transmission is being made from the NC to that MD in that particular sector by one antenna, and one or more simultaneous transmissions are also being made from the NC to other MDs in other sectors by other antennas. For this calculation, the strongest RSSI seen by the intended MD may be used as the signal value (and indicate the relevant sector), while the RSSIs seen by the intended MD when transmissions are made to other sectors by other antennas may be used as the interference-plus-noise value.

In one embodiment, the SINR for a particular sector may be calculated as:

$$SINR = RSSI\text{-}T/RSSI\text{-}O$$

where RSSI-T is the RSSI measured by a device in the targeted sector (the sector for which an SINR value is desired) for a transmission directed to that sector, and RSSI-O is the sum of the RSSI values measured by that same device for transmissions made to other sectors. For future calculations, separate SINRs may be derived that consider the effect of each of the other sectors individually, that consider each pair of the other sectors, etc., until every feasible combination of other sectors has been considered. This will allow the 'groups' that are determined later to have a variable number of devices, from two devices up to the maximum number of devices. Some embodiments may consider only the RSSI values when calculating the SINRs, but other embodiments may factor in other indictors as well.

Based on these SINR values, at 325 various combinations may be found that involve each antenna transmitting to a different particular sector, without having excessive interference from the other antennas that are simultaneously transmitting to other sectors. In many instances, multiple such combinations may be found. At 330, these non-interfering combinations may be used to assign the various MDs to different groups, with each group having MDs that represent one of these non-interfering combinations (i.e., each group has multiple MDs with each MD in a different sector, with those sectors being non-interfering with each other). In this manner, the NC may use different antennas to simultaneously transmit separate signals to each MD in a group, without any antenna causing interference at any of the other MDs to which it is not trying to transmit.

Once these groupings have been defined, flow may move to 'B' in the flow diagram for further operations. If sector training has produced satisfactory results, 'B' may represent operations (not shown) for communicating between the NC and the various MDs, using the defined groups. If this process has not produced satisfactory results, flow may move to FIG. 3B or 3C to further refine the directionality and beam width to be used in directional communications between the NC and MDs. These further processes are referred to here as 'beam refinement'. Beam refinement may be used to narrow the beam and/or shift the center of the beam in a clockwise or counter-clockwise direction.

Beam Refinement Using Antenna Weight Vectors

Figure 3B:
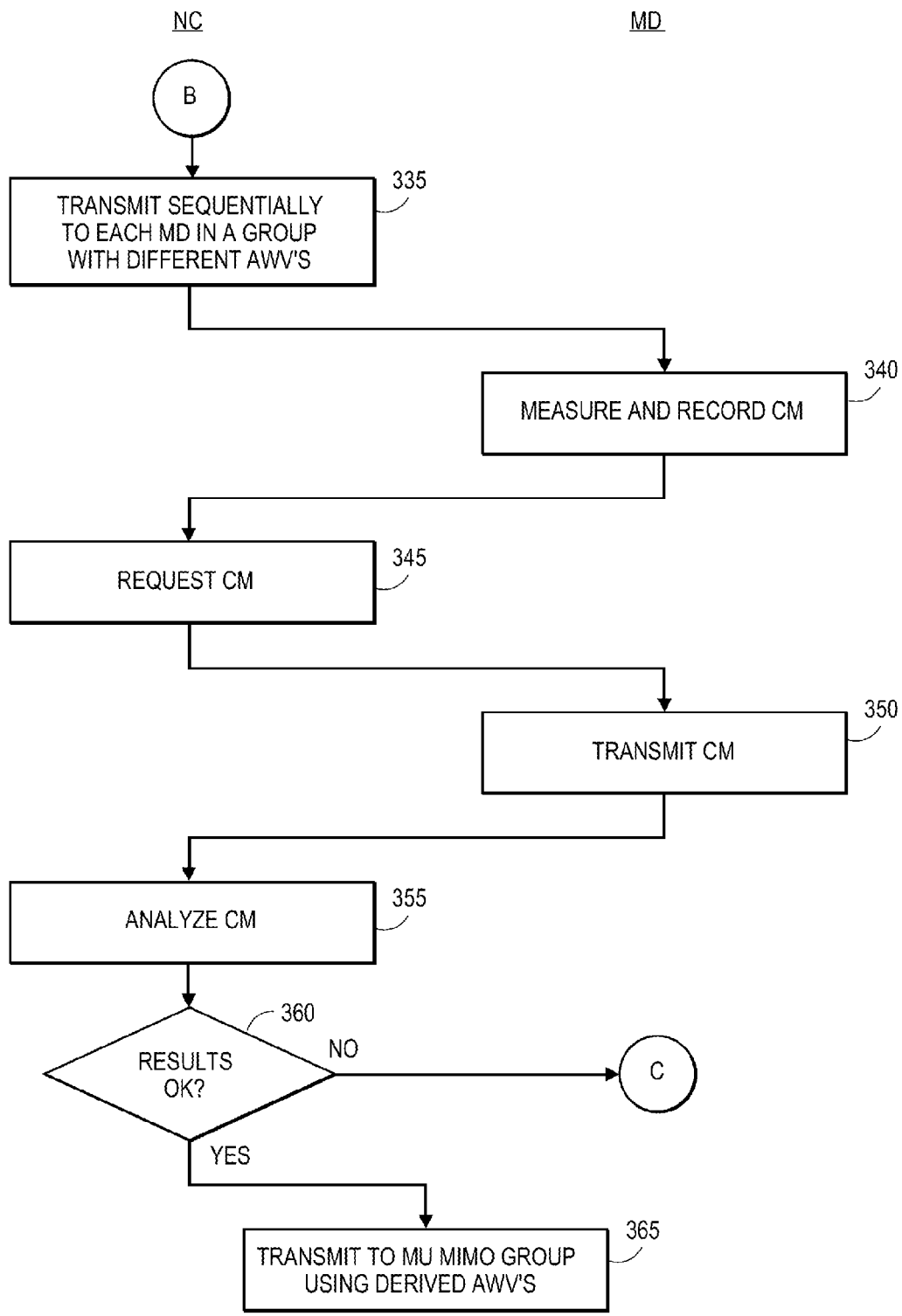
FIG. 3B shows a flow diagram of a method of multiuser beam forming training involving antenna weight vectors, according to an embodiment of the invention.

FIG. 3B shows a flow diagram of a method of multiuser beam forming training involving antenna weight vectors, according to an embodiment of the invention. In the illustrated embodiment, after organizing MDs into groups (e.g., by performing the operations of FIG. 3A), operations in FIG. 3B may begin at 'B', where the NC performs the following operations on the MDs in one of the groups that was created at 330 in FIG. 3A.

At 335, the NC may transmit a training sequence from a first of the NC's antennas, sequentially using different AWVs. In some embodiments, the training sequence may start with the AWV used in FIG. 3A, and then change that to a second AWV, then to a third AWV, etc. The number of different AWVs to use, the method of choosing which AWVs to use, and the length of time to transmit with each one, may depend on various factors not discussed here.

This process of transmitting a training sequence may be repeated for each antenna on the NC. Each transmission may include indicators to indicate which antenna, and which AWV, is being used for the transmission at any particular time, so that the receiving MDs may be able to associate statistics on the received signal with those indicators. Each transmission from the NC may also include destination address(es) specifying the MD's in the targeted group, so that other MDs in other groups will know to ignore this training sequence. Those other groups of MDs may use the same overall procedure at a later time.

At 340, each MD in the group may receive the training sequence, and record various parameters for each training sequence received, along with the antenna and AWV for each set of parameters. These parameters are referred to here as channel measurement (CM) information, which may include RSSI, SINR, tap delay, etc.

At some point, the NC may request this CM information from the MDs in the group at 345, and the MDs may transmit that information to the NC at 350. In some embodiments the NC may transmit a poll to each individual MD and wait for a response. In other embodiments, the NC may schedule the various MDs in the group to transmit their information at indicated times. Other techniques may also be used.

At this point the NC should have CM information from each MD in the group for each AWV of each antenna. (For those combinations for which no signal was received by the MD, a null information package may be transmitted by the MD, or just assumed by the NC). After analyzing this information at 355, the NC may be able to improve upon the results of the sector training process described earlier for FIG. 3A. For example, an AWV that directs a signal towards the border between two adjacent sectors may be a better choice for an MD that is located on that border. Similarly, a beam width that is narrower than a sector may allow MDs that are in the same sector to communicate simultaneously.

If satisfactory results are obtained (i.e., if the AWV results in a directed signal towards one MD in the group while directing a null at the other MDs in the group), then the collective AWVs determined for multiple antennas may be used to transmit to the MDs in the group at 365. However, if the results are not satisfactory for a particular MD, then another approach may be tried at 'C'. For example, the process of FIG. 3B may be repeated with a different set of AWVs, or the process of FIG. 3C may be tried. Other techniques, not described here, may also be tried.

Although the preceding description has covered AWV-based BFT for downlink communications (transmissions from the NC to multiple MD's), a similar process may be followed to train the NC antennas for uplink communications (transmissions from the MD's to the NC). In this process, each MD in turn may transmit a training sequence to the NC using that MD's best AWV (e.g., as determined during a training sequence to train the MD's antennas, which may be separate from the procedures described in this document). During each MD's training sequence, the NC may sequentially try different AWVs for reception and record CM information for each. After completing this process for all the MDs in a group, the NC may determine which AWVs allow the NC to receive strongly from one MD while essentially receiving nulls from the other MDs in the group. Such AWVs may be determined for each MD in the group.

Figure 3C:
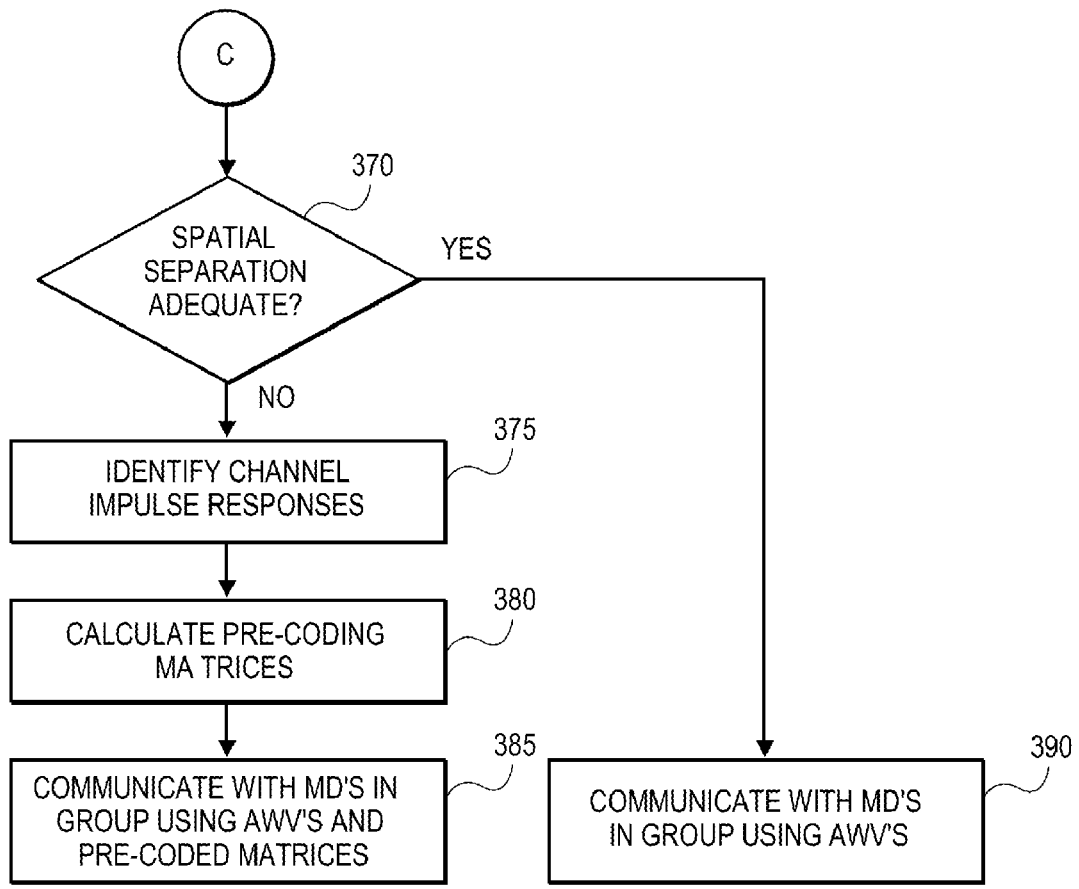
FIG. 3C shows a flow diagram of a method of multiuser beam forming training involving pre-coded matrices, according to an embodiment of the invention.

If spatial separation between different communications with different MDs is inadequate after the process of FIG. 3A and/or the process of FIG. 3B, the process of FIG. 3C may be used.

Beam Refinement Using MIMO Pre-Coded Matrices

FIG. 3C shows a flow diagram of a method of multiuser beam forming training involving pre-coded matrices, according to an embodiment of the invention. In the illustrated embodiment, after performing the operations of FIG. 3B, operations in FIG. 3C may begin at 'C', where the NC performs the following operations on the MDs in one of the groups that was created at 330 in FIG. 3A.

For any groups that obtained satisfactory results in the procedures of FIG. 3B, no further training may be necessary. However, in some instances, two MDs may have inadequate spatial separation (i.e., the angular difference of their direction from the NC is too small to communicate with both simultaneously without mutual interference). In such instances, pre-coded matrices may be used to permit each MD to separate its message from the message of the adjacent MD.

This decision may be made at 370. If spatial separation is adequate, the NC may proceed to communicate with the MDs in the group at 390, using the AWVs that were previously determined. However, if any two or more MDs in a group are too close to communicate simultaneously without interference, then the NC may initiate a communications sequence with those MDs to identify channel impulse responses at 375. In some instances, the NC may require the MD to report per-tone SINR in channel measurements. Based on the channel impulse responses, at 380 the NC may calculate pre-coded matrices to use in communications with these MDs.

For single-carrier PHY communication an N×N matrix may be calculated, where N is the number of MDs in the group. For multi-carrier PHY communication such as orthogonal frequency division multiplexing (OFDM), communication takes place over multiple parallel subcarriers. In this case, two different approaches may be used. In the first instance, an N×N matrix may be calculated, and that same N×N matrix applied to each subcarrier. In the second instance, an N×N×M matrix may be calculated, where M is the number of subcarriers being used, and a different N×N matrix may then be used for each sub-carrier. Once the matrices have been calculated, they may be applied to the communications with the MDs in the group at 385.

In some embodiments, if one of the described training procedures produced satisfactory results for some groups but not for others, a hybrid approach may be taken. Those groups for which satisfactory results were obtained may use those results for subsequent MU MIMO communications. The remaining groups may try other procedures, whether or not described here, until they also get satisfactory results. In some cases, it may not be feasible to place one or more particular MDs into a group. In such instances, the NC may communicate with those MDs individually rather than in a group.

The foregoing description is intended to be illustrative and not limiting. Variations will occur to those of skill in the art. Those variations are intended to be included in the various embodiments of the invention, which are limited only by the scope of the following claims.

What is claimed is:

1. A method, comprising:
transmitting, from a first of multiple antennas, training signals directionally in each of multiple sectors;
repeating said transmitting from each of a remainder of the multiple antennas;
receiving, from each of multiple mobile devices (MDs), information containing a sector identifier and an associated received signal strength indicator (RSSI) for each training signal received by said each of the multiple MDs;
locating each of the multiple MDs in a particular sector, based on the received RSSIs;
determining, for each sector, a signal-to-interference-and-noise ratio (SINR) for each combination of a transmission to that sector from one antenna and a transmission to another sector from another antenna;
determining non-interfering combinations of sectors, based on said SINRs; and
allocating the MDs into groups, with each group containing a maximum of one MD per sector for sectors whose SINR indicates simultaneous transmissions to all the MD's in the group from different antennas will not result in mutual interference.

2. The method of claim 1, wherein at least one of the combinations includes a transmission to a particular sector, a transmission to a first other sector, and a transmission to a second other sector.

3. The method of claim 1, wherein said locating comprises assigning a particular MD to a particular sector corresponding to a highest RSSI value received by the particular MD.

4. The method of claim 1, further comprising:
transmitting, from the first antenna, additional training sequences to the MDs in a group, each of the additional training sequences having a different antenna weight vector;
receiving sets of channel measurements from each of the MDs in the group, each set of channel measurements indicating which antenna weight vector is associated with each set of channel measurements; and
associating a particular antenna weight vector with a particular MD in the group, based on the sets of channel measurements.

5. The method of claim 4, wherein the particular antenna weight vector creates a directional signal toward the particular MD and a null towards each remaining MD in the group.

6. The method of claim 4, further comprising repeating said transmitting, receiving, and associating for said each of the remainder of the multiple antennas.

7. The method of claim 4, further comprising:
  identifying channel impulse responses for at least some MDs in the group;
  determining multiple-input-multiple-output pre-coding matrices based on the channel impulse responses; and
  using the pre-coding matrices in communications with said at least some MDs.

8. The method of claim 7, wherein each matrix comprises an N×N matrix, where N is a quantity of MDs in the group.

9. An apparatus comprising a wireless communications device with multiple antennas, each antenna having multiple elements for directional communication, the device to:
  transmit, from a first of the multiple antennas, training signals directionally in each of multiple sectors;
  repeat said transmitting from each of a remainder of the multiple antennas;
  receive, from each of multiple mobile devices (MDs), information containing a sector identifier and an associated received signal strength indicator (RSSI) for each training signal received by said each of the multiple MDs;
  locate each of the multiple MDs in a particular sector, based on the received RSSIs;
  determine, for each sector, a signal-to-interference-and-noise ratio (SINR) for each combination of a transmission to that sector from one antenna and a transmission to another sector from another antenna;
  determine non-interfering combinations of sectors, based on said SINRs; and
  allocate the MDs into groups, with each group containing a maximum of one MD per sector for sectors whose SINR indicates simultaneous transmissions to all the MD's in the group from different antennas will not result in mutual interference.

10. The apparatus of claim 9, wherein at least one of the combinations is to include a transmission to a particular sector, a transmission to a first other sector, and a transmission to a second other sector.

11. The apparatus of claim 9, wherein said locating comprises assigning a particular MD to a particular sector corresponding to a highest RSSI value received by the particular MD.

12. The apparatus of claim 9, wherein the device is further to:
  transmit, from the first antenna, additional training sequences to the MDs in a group, each of the additional training sequences having a different antenna weight vector;
  receive sets of channel measurements from each of the MDs in the group, each set of channel measurements indicating which antenna weight vector is associated with each set of channel measurements; and
  associate a particular antenna weight vector with a particular MD in the group, based on the sets of channel measurements.

13. The apparatus of claim 12, wherein the particular antenna weight vector is to create a directional signal toward the particular MD and a null towards each remaining MD in the group.

14. The apparatus of claim 9, wherein the device is further to:
  identify channel impulse responses for at least some MDs in the group;
  determine pre-coding matrices based on the channel impulse responses; and
  use the pre-coding matrices in communications with said at least some MDs.

15. The apparatus of claim 14, wherein each matrix comprises an N×N matrix, where N is a quantity of MDs in the group.

16. An article comprising
a computer-readable non-transitory storage medium that contains instructions, which when executed by one or more processors result in performing operations comprising:
  transmitting, from a first of multiple antennas, training signals directionally in each of multiple sectors;
  repeating said transmitting from each of a remainder of the multiple antennas;
  receiving, from each of multiple mobile devices (MDs), information containing a sector identifier and an associated received signal strength indicator (RSSI) for each training signal received by said each of the multiple MDs;
  locating each of the multiple MDs in a particular sector, based on the received RSSIs;
  determining, for each sector, a signal-to-interference-and-noise ratio (SINR) for each combination of a transmission to that sector from one antenna and a transmission to another sector from another antenna;
  determining non-interfering combinations of sectors, based on said SINRs; and
  allocating the MDs into groups, with each group containing a maximum of one MD per sector for sectors whose SINR indicates simultaneous transmissions to all the MD's in the group from different antennas will not result in mutual interference.

17. The article of claim 16, wherein at least one of the combinations includes a transmission to a particular sector, a transmission to a first other sector, and a transmission to a second other sector.

18. The article of claim 16, wherein the operation of locating comprises assigning a particular MD to a particular sector corresponding to a highest RSSI value received by the particular MD.

19. The article of claim 16, wherein the operations further comprise:
  transmitting, from the first antenna, additional training sequences to the MDs in a group, each of the additional training sequences having a different antenna weight vector;
  receiving sets of channel measurements from each of the MDs in the group, each set of channel measurements indicating which antenna weight vector is associated with each set of channel measurements; and
  associating a particular antenna weight vector with a particular MD in the group, based on the sets of channel measurements.

20. The article of claim 19, wherein the particular antenna weight vector creates a directional signal toward the particular MD and a null towards each remaining MD in the group.

21. The article of claim 16, wherein the operations further comprise repeating said transmitting, said repeating, said receiving, said locating, said determining SINR, said determining combinations, and said allocating, for said each of the remainder of the multiple antennas.

22. The article of claim 19, further comprising:
  identifying channel impulse responses for at least some MDs in the group;
  determining pre-coding matrices based on the channel impulse responses; and
  using the pre-coding matrices in communications with said at least some MDs.

23. The article of claim 22, wherein each matrix comprises an N×N matrix, where N is a quantity of MDs in the group.

* * * * *

UNITED STATES PATENT AND TRADEMARK OFFICE
CERTIFICATE OF CORRECTION

PATENT NO. : 8,340,601 B2  Page 1 of 1
APPLICATION NO. : 12/952848
DATED : December 25, 2012
INVENTOR(S) : Michelle X. Gong et al.

It is certified that error appears in the above-identified patent and that said Letters Patent is hereby corrected as shown below:

On Drawing sheet 5 of 5, in Figure 3C, Box No. 380, line 2, delete "MA TRICES" and insert -- MATRICES --, therefor.

Signed and Sealed this
Nineteenth Day of March, 2013

Teresa Stanek Rea
*Acting Director of the United States Patent and Trademark Office*